Nov. 1, 1955   R. T. KRIEGHOFF   2,722,391
ENGINE MOUNT
Filed May 31, 1952
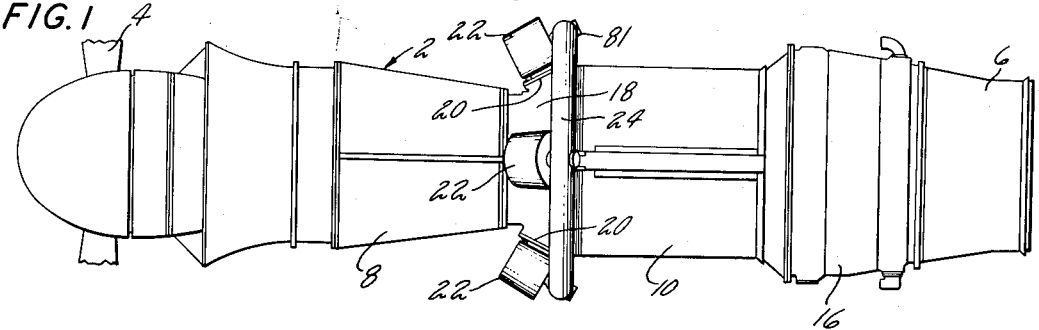
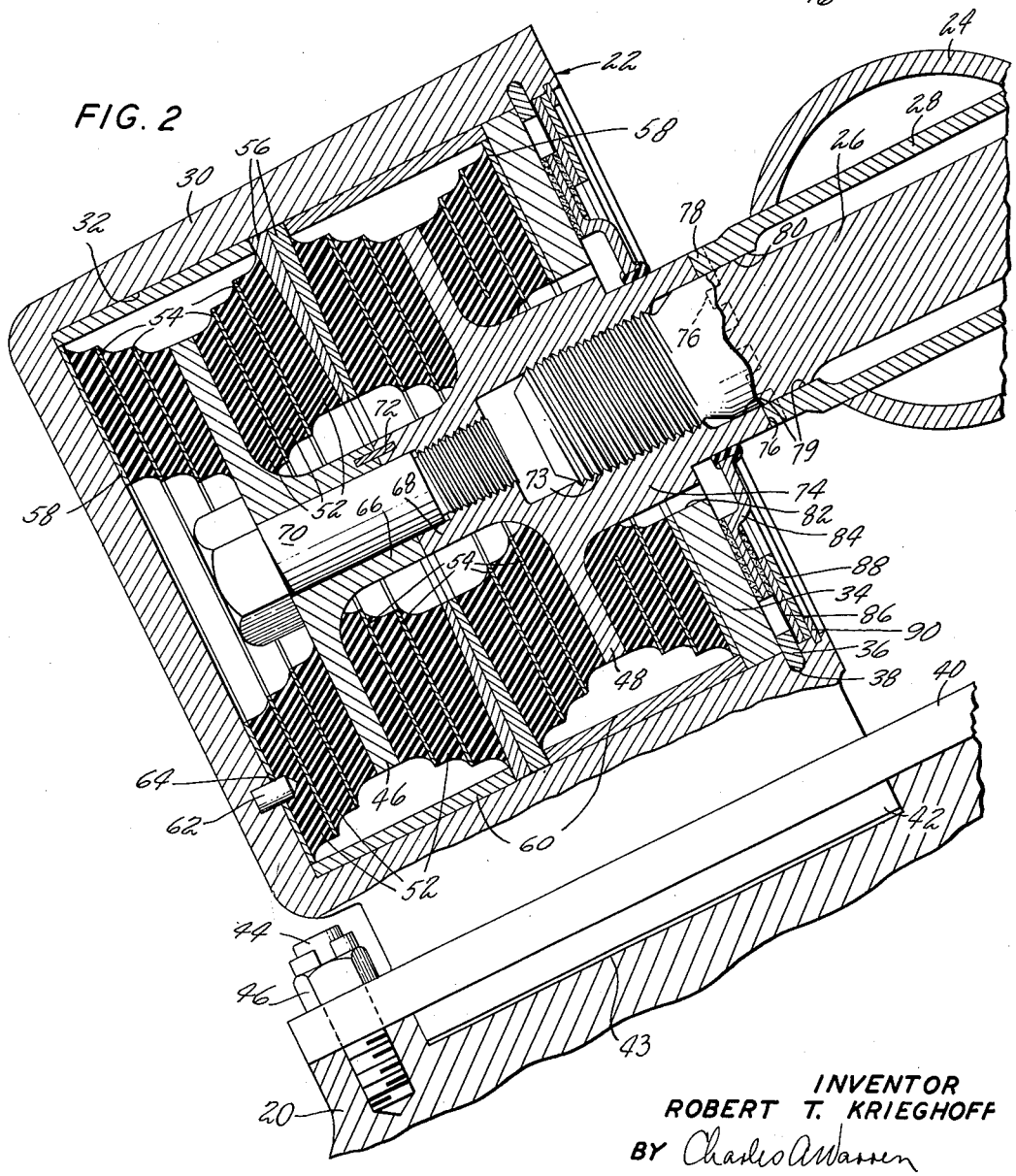
INVENTOR
ROBERT T. KRIEGHOFF
BY Charles A. Warren
ATTORNEY United States Patent Office 2,722,391
Patented Nov. 1, 1955

2,722,391

ENGINE MOUNT

Robert T. Krieghoff, West Hartford, Conn., assignor to United Aircraft Corporation, East Hartford, Conn., a corporation of Delaware Application May 31, 1952, Serial No. 290,878

15 Claims. (Cl. 248—5)

This invention relates to engine mounts and particularly to the vibration isolator type of engine mount by which to minimize the transmission of engine vibrations to the air frame.

With the advent of gas turbine engines which are generally smaller in diameter than piston engines the diameters at which the engine mounts are connected to the engine are smaller so that the individual mounts are required to resist a greater torque. The smaller diameter at which the engine mounts are located also requires either fewer mounts by reason of a limited space or mounts of smaller size in order to have enough space for the attachment of the mounts to the engine without interfering with the engine structure.

One feature of the invention is a small dimension mount which will satisfy these requirements. More specifically, a feature of the invention is a mount which is of relatively small dimension circumferentially of the engine and which will carry the high loads applied thereto by the power plant.

One feature of the invention is a double core assembly for the engine mount with an arrangement for distributing the load between the cores. With the double core arrangement and with the cores in parallel it is possible to obtain for a given size of mount twice as much stiffness and shear area than a single core would provide.

Other features and advantages will be apparent from the specification and claims, and from the accompanying drawings which illustrate an embodiment of the invention.

Fig. 1 is an elevation of a power plant showing an arrangement of the mounts.

Fig. 2 is a sectional view through one of the engine mounts.

The invention is shown in conjunction with a gas turbine power plant 2 which drives a propeller 4 and discharges gas through a nozzle 6 for additional thrust. The engine may include a compressor 8 discharging gas into a combustor 10 where fuel is added through a fuel manifold not shown. From the combustor, the gas is discharged through a turbine 16 and thence through the thrust nozzle. A part of the power plant has a frame section 18, the outer surface of which is substantially frusto-conical with a number of mounting pads 20 to which the engine mounts 22 are connected.

In the arrangement shown the several engine mounts 22 which are attached to the pads 20 form the sole supporting means between the engine and a supporting ring 24 which latter is securely connected to the frame of the aircraft in which the gas turbine engine is mounted. For the purpose of attachment to the ring each mount has a projecting stem 26 fitting within a sleeve 28, Fig. 2, which forms an integral part of the ring 24.

The engine mount includes a housing 30 which has a cylindrical recess 32 therein, the axis of which lies approximately in an axial plane with respect to the gas turbine power plant but which is arranged in that plane at such an angle to the power plant axis as to be parallel to the sleeve 28 in the supporting ring. The recess 32 is closed at both ends by the housing, one end of the recess being in the form of a removable plate or cover 34 which, when the mount is assembled, is held in predetermined relation to the remainder of the housing by a snap ring 36 fitting in a groove 38 in the main part of the housing. The housing has on the outer wall thereof a mounting flange 40 with a projecting pilot 42 by which the housing is located on the pad 20. It will be understood that the pad will have a recessed portion 43 for engagement by the pilot 42 to pilot the mount and the flange 40 is held in position by studs 44 and nuts 46.

The stem 26 which forms a part of the member which is attached to the engine support ring 24 carries a double core assembly which is mounted within the recess 32 in the housing. The core assemblies are rigidly attached to the stem and function as an integral part thereof when the mount is in use. The stem carries spaced parallel flanges 46 and 48, the outer diameters of which are smaller than the diameter of the recess 32. On each side of each flange 46 and 48 is bonded a cushion member which consists of alternating discs of rubber 52 and metal 54. Bonded to the outermost rubber discs 52 of each member are plates 56 and 58. The spacing of flanges 46 and 48 and the thickness of the cushion members are such that the end discs 56 which are mounted on the cushion members bonded to the adjacent sides of the flanges 46 and 48 are in engagement with each other as shown. These end elements 56, referred to as inner end plates or elements, preferably have a diameter almost exactly the same as the diameter of the recess 32 to be a sliding fit therein such that they are piloted therein, being supported against radial movement.

The outer end plates or elements 58 engage with the ends of the recess 32 so that one of the discs 58 is in engagement with the removable end of the recess as shown. Each of these discs 58 is preferably smaller in diameter than the diameter of the recess 32 to be received within and piloted by spacer elements 60 which extend from the inner end plates 56 to the ends of the recess 32 thereby functioning to position the inner end plates securely against axial movement within the recess and also functioning to support the outer end plates 58 against radial movement within the recess.

In addition to the positioning of the core assemblies by the spacers 60 the core assemblies are also supported against turning movement within the recess by one or more locating pins 62 projecting from one end wall of the housing and into an opening 64 in one of the end plates 58.

For the purpose of assembly the flanges 46 and 48 with the cushion members thereon are made separately so that the bonded rubber and metal elements thereon may be readily attached. The flanges 46 and 48 have integral hubs 66 and 68 which are in endwise engagement to maintain the proper spacing between the discs. Alignment of these hubs is maintained by a bolt 70 which extends through these hubs and may be threaded into the hub 68 for the purpose of retaining the discs in assembled relation. A locating pin 72 may be used to prevent relative rotation of the two discs. Further, for the purpose of assembly the flange 48 is separable from the stem 26, the latter being threaded at its inner end to engage with cooperating threads 73 provided in a projecting hub 74 on the flange 48. The outer end of the hub 74 is notched as at 76 to receive projections 78 on the sleeve 28. The hub 74 and the sleeve 28 at their interengaging ends have the same internal diameters 79 and are piloted by a portion 80 of the stem 26, the diameter of which is substantially the same as that of the hub and sleeve. The outer end of stem 26 may have a bolt head 81 by which to screw the stem into the hub 74.

In order for the engine mount to function as a vibration isolator the stem 26 with the associated flanges 46 and 48 must be permitted to move laterally within the housing. For this purpose the end of the housing through which the stem projects has a centrally located opening 82 the diameter of which is larger than the diameter of the stem 26 where it extends through the opening so that lateral movement of the stem is not interfered with. Movement of the stem perpendicular to its axis may be damped through a frictional damper including a ring 84 surrounding and engaging with the stem and overlying the end plate 34. A pressure plate 86 holds the ring 85 against the cover plate 34 and a normally dished spring 88 held in position by a snap ring 90 applies a predetermined load against the ring 84.

It is to be understood that the invention is not limited to the specific embodiment herein illustrated and described, but may be used in other ways without departure from its spirit as defined by the following claims.

I claim:

1. A core assembly for an engine mount including a stem having means at one end for attachment to an engine support, spaced parallel flanges on said stem cushion elements bonded to opposite sides of each flange, and end plates bonded to the cushion elements in substantially parallel relation to the flanges, said stem on which the flanges are positioned being separable between the flanges to form two stem portions with a flange on each portion, and means for holding said portions together in assembled relation.

2. A core assembly for an engine mount including a stem having means at one end for attachment to an engine support, spaced parallel flanges on said stem, cushion elements bonded to opposite sides of each flange, and end plates bonded to the cushion elements in substantially parallel relation to the flanges, said stem on which the flanges are positioned being separable between the flanges to form two stem portions with a flange on each portion, and with a hub on each portion, the hubs projecting toward each other and being in endwise engagement when the portions are assembled, and releasable means in the form of a bolt for holding said two portions together with the hubs in endwise engagement.

3. A core assembly for an engine mount including a stem having means at one end for attachment to an engine support, spaced parallel flanges on said stem, cushion elements bonded to opposite sides of each flange, and end plates bonded to the cushion elements in substantially parallel relation to the flanges, said stem on which the flanges are positioned being separable between the flanges to form two stem portions with a flange on each portion, and with a hub on each portion, the hubs projecting toward each other and being in endwise engagement when the portions are assembled, and releasable means in the form of a bolt for holding said two portions together with the hubs in endwise engagement, said hubs having bores therein to receive the bolt and the diameter of the bolt being such that the bolt pilots the hubs to retain them in concentric relation to each other.

4. An engine mount providing a connection between an engine structure and a support structure including a housing having means thereon for attachment to one of said structures, and a member positioned within said housing and having a portion projecting from said housing, said portion being adapted for attachment to the other of said structures, said member having spaced parallel flanges thereon, cushion elements bonded to each of said flanges on both sides thereof, end plates on the ends of the cushion elements remote from the flanges, said end plates being in substantially parallel relation to the flanges, the plates located on the ends of the cushion elements between the parallel flanges being inner end plates, said flanges and cushion elements being positioned within the housing with the inner end plates supported in fixed relation to said housing, said housing having an open end to receive said flanges and cushion elements, and a cover element forming part of the housing and closing the open end of the housing to retain said flanges, plates, and cushion elements within the housing, said cover having an opening therein through which said member extends for attachment to the engine support, the opening in said cover being larger than the portion of the member located therein.

5. An engine mount including a housing having means for attachment to an engine, a member adapted for attachment to an engine support, said member having spaced parallel flanges thereon, cushion elements located on both sides of each of said flanges and bonded to said flanges, said flanges and cushion elements being positioned within the housing, said cushion elements having end plates bonded thereon and arranged parallel to said flanges, the end plates located on the cushion elements between the flanges being inner end elements, and the end plates on the cushion elements on the outer sides of the flanges being the outer end plates, the outer end plates engaging with the opposite ends of the housing, and the inner end plates being in engagement with each other, and spacer sleeves within the housing and engaging with the inner end plates to hold them in fixed axial position within the housing.

6. An engine mount providing a connection between an engine structure and a support structure including a housing having means thereon for attachment to one of said structures, and a member positioned within said housing and having a portion projecting from said housing, said portion being adapted for attachment to the other of said structures, said member having spaced parallel flanges thereon, cushion elements bonded to said flanges on both sides thereof, said flanges and cushion elements being positioned within the housing, said cushion elements having end plates bonded thereon and arranged parallel to said flanges, the outer end plates, which are located on the cushion elements on the outer sides of the flanges, engaging with the opposite ends of the housing, and the inner end plates, which are located on the cushion elements between the flanges, being in engagement with each other, and means for supporting said inner end plates against movement within the housing.

7. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess, cushion elements bonded to opposite sides of each flange, and end plates bonded to the cushion elements in substantially parallel relation to the flanges, the plates located on the ends of the cushion elements between the parallel flanges being inner end plates, said inner end plates being supported by the housing to prevent movement therein in a direction parallel to the said inner end plates.

8. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess cushion elements bonded to opposite sides of each flange, and end plates bonded to the cushion elements in substantially parallel relation to the flanges, the plates located on the ends of the cushion elements between the parallel flanges being inner end plates, the inner end plates being supported by the housing to prevent movement therein in a direction parallel to the said inner end plates, and the outer end plates which are on the cushion elements on the outer sides of the flanges engaging the end walls of the housing.

9. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening therein, and having means thereon for attachment to an engine support, in combination with spaced parallel flanges on said member and within the recess, cushion elements bonded to opposite sides of each flange, end plates bonded to the cushion elements in substantially parallel relation to the flanges, the plates located on the ends of the cushion elements between the parallel flanges being inner end plates, the inner end plates being in engagement with each other, and means associated with the housing for supporting the inner end plates in fixed relation to the housing.

10. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess, cushion elements bonded to opposite sides of each flange, end plates bonded to the cushion elements in substantially parallel relation to the flanges, the plates located on the ends of the cushion elements between the parallel flanges being inner end plates, and spacer means within the housing for retaining the inner end plates in predetermined spaced relation to the end walls of the housing.

11. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess, cushion elements bonded to opposite sides of each flange, end plates bonded to the cushion elements in substantially parallel relation to the flanges, the inner end plates which are located on the cushion elements between the flanges being in engagement with each other, and spacer means within the housing for retaining the inner end plates in predetermined spaced relation to the end walls of the housing, said spacer means being sleeves extending from the end walls of the housing into engagement with the inner end plates.

12. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess, cushion elements bonded to opposite sides of each flange, and end plates bonded to the cushion elements in substantially parallel relation to the flanges, the inner end plates which are located on the cushion elements between the flanges being supported by the housing to prevent movement therein in a direction parallel to the said inner end plates, the spaced flanges with the attached cushion elements and end plates being separable from one another, and means for securing flanges and attached elements together in assembled relation.

13. An engine mount including a housing having means for attachment to an engine, said housing providing a substantially cylindrical recess therein closed at both ends, one end of the housing being removable for access to the cylindrical recess, one end of the housing having a central opening therein, and a member extending through the opening and having means thereon for attachment to an engine support, in combination with spaced parallel flanges on said member and within the recess, cushion elements bonded to opposite sides of each flange, and end plates bonded to the cushion elements in substantially parallel relation to the flanges, the inner end plates which are located on the cushion elements between the flanges being supported by the housing to prevent movement therein in a direction parallel to the said inner end plates, said flanges being smaller in diameter than the recess in the housing to provide for lateral movement of the member with respect to the housing.

14. A core assembly for an engine mount, including a stem having means at one end for attachment to an engine support, spaced parallel flanges on said stem, a plurality of annular cushion elements attached to said flanges, there being a cushion element bonded to each side of each flange, the cushion elements located between the flanges being inner cushion elements and the cushion elements on the outer sides of the flanges being the outer cushion elements, a pair of inner end plates one of which is bonded to each inner cushion element in parallel relation to the flanges, the inner end plates being in engagement with each other, a pair of outer end plates one of which is bonded to each outer cushion element in substantially parallel relation to the flanges, all of said end plates projecting radially from the stem a greater distance than the cushion elements and the flanges, and each of said end plates having a central opening larger than the stem.

15. A core assembly for an engine mount including a stem having means at one end for attachment to an engine support, spaced parallel flanges on said stem, a plurality of annular cushion elements attached to said flanges, there being a cushion element bonded to each side of each flange, the cushion elements located between the flanges being inner cushion elements and the cushion elements on the outer sides of the flanges being the outer cushion elements, a pair of inner end plates one of which is bonded to each inner cushion element in parallel relation to the flanges, the inner end plates being in engagement with each other, a pair of outer end plates one of which is bonded to each outer cushion element in substantially parallel relation to the flanges, all of said end plates projecting radially from the stem a greater distance than the cushion elements and the flanges, and each of said end plates having a central opening larger than the stem, the inner end plates having a larger outer diameter than the outer end plates.

References Cited in the file of this patent

UNITED STATES PATENTS

| | | |
|---|---|---|
| 2,241,408 | Lord | May 13, 1941 |
| 2,297,506 | Schmidt | Sept. 29, 1942 |
| 2,477,501 | Tyler et al. | July 26, 1949 |
| 2,630,105 | Hasbrouck et al. | Mar. 3, 1953 |

FOREIGN PATENTS

| | | |
|---|---|---|
| 823,071 | France | Oct. 11, 1937 |